United States Patent [19]
Ezra et al.

[11] Patent Number: 5,726,800
[45] Date of Patent: Mar. 10, 1998

[54] AUTOSTEREOSCOPIC DIRECTIONAL DISPLAY APPARATUS

[75] Inventors: David Ezra, Oxon; Graham J. Woodgate; Basil Arthur Omar, both of Oxfordshire, all of United Kingdom

[73] Assignee: Sharp Kabushiki Kaisha, Osaka, Japan

[21] Appl. No.: 167,497

[22] Filed: Dec. 15, 1993

[30] Foreign Application Priority Data

Dec. 17, 1992 [GB] United Kingdom ............ 9226272
Dec. 1, 1993 [GB] United Kingdom ............ 9324703

[51] Int. Cl.⁶ ............................ G02B 27/22; H04N 13/04
[52] U.S. Cl. ............................ 359/466; 359/462; 359/463; 348/51; 348/52
[58] Field of Search ............................ 359/462, 463, 359/471, 472, 41, 48, 464, 466; 348/51, 52, 55, 59; H04N 13/00, 13/04

[56] References Cited

U.S. PATENT DOCUMENTS

| | | |
|---|---|---|
| 1,992,872 | 2/1935 | Mahler. |
| 2,550,350 | 4/1951 | Henson ............ 359/463 |
| 2,883,906 | 4/1959 | Rehom ............ 359/463 |
| 4,535,354 | 8/1985 | Rickert ............ 348/52 |
| 4,623,223 | 11/1986 | Kempf ............ 359/472 |
| 5,003,385 | 3/1991 | Sudo ............ 359/464 |
| 5,083,199 | 1/1992 | Borner ............ 358/88 |
| 5,132,839 | 7/1992 | Travis ............ 359/463 |

FOREIGN PATENT DOCUMENTS

| | | |
|---|---|---|
| 0262955 | 4/1988 | European Pat. Off.. |
| 0189233 | 7/1988 | European Pat. Off.. |
| 0508824 | 10/1992 | European Pat. Off.. |
| 5-70179A2 | 11/1993 | European Pat. Off.. |
| 4004739 | 8/1991 | Germany. |
| 61-113389 | 5/1986 | Japan. |
| 1121097 | 7/1968 | United Kingdom. |
| 1346915 | 2/1974 | United Kingdom. |
| 2066503 | 7/1981 | United Kingdom. |
| 2185825 | 7/1987 | United Kingdom. |
| 2206763 | 1/1989 | United Kingdom. |
| 2267579 | 12/1993 | United Kingdom. |
| 7900308 | 6/1979 | WIPO. |
| WO8302169 | 6/1983 | WIPO. |
| WO9319394 | 9/1993 | WIPO. |

OTHER PUBLICATIONS

European Search Report dated Feb. 17, 1997, for European Patent Application No. 96118828.1.

Search Report for UK. Appl. 9324703.9, dated Jan. 24, 1994.

*Primary Examiner*—Paul M. Dzierzynski
*Assistant Examiner*—Audrey Chang

[57] ABSTRACT

The number of 2D views available to form an autostereoscopic 3D image is increased by using a beam combiner with two displays. Each display may comprise sequentially illuminatable light sources imaged by converging lenses for illuminating sequentially reproduced 2D images in spatial light modulators. The views are combined by the beam combiner so as to be visible to an observer in different directions corresponding to the directions from which the views were recorded during image capture.

45 Claims, 15 Drawing Sheets

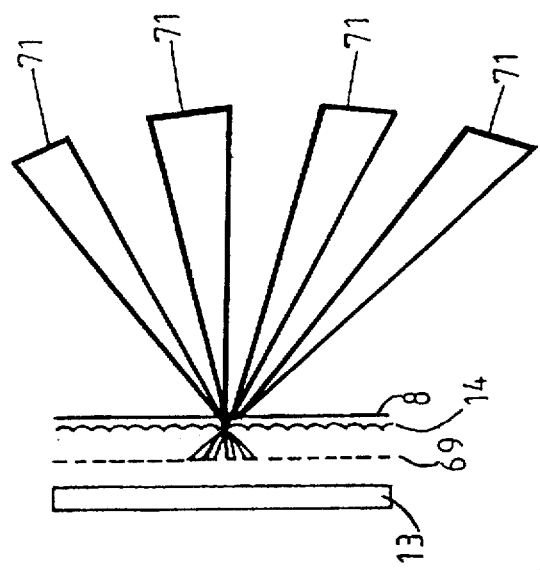
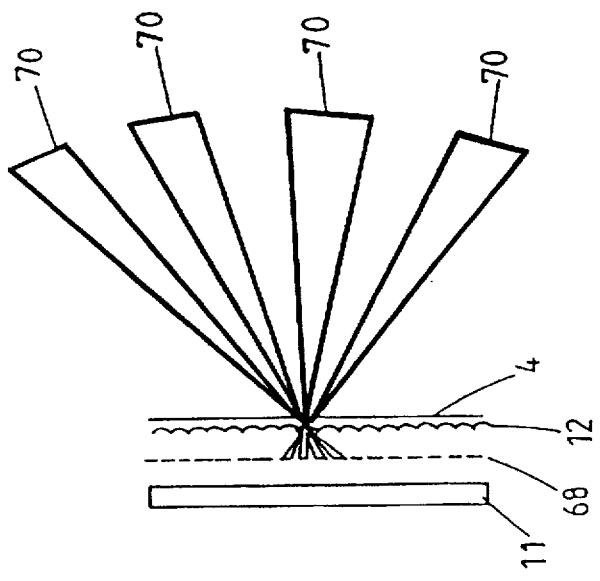
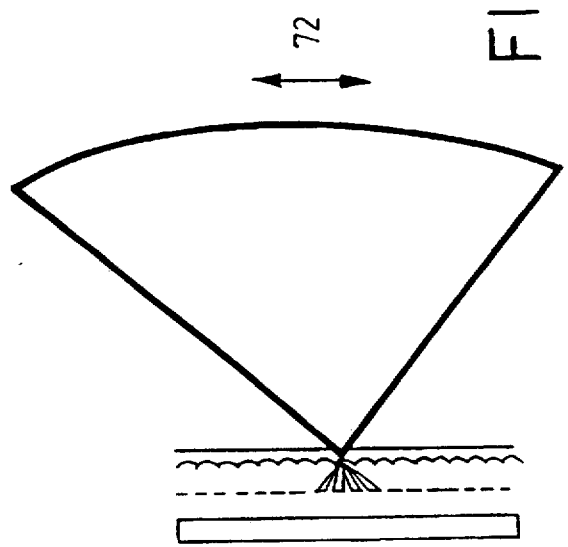
FIG. 15a
FIG. 15b
FIG. 15c

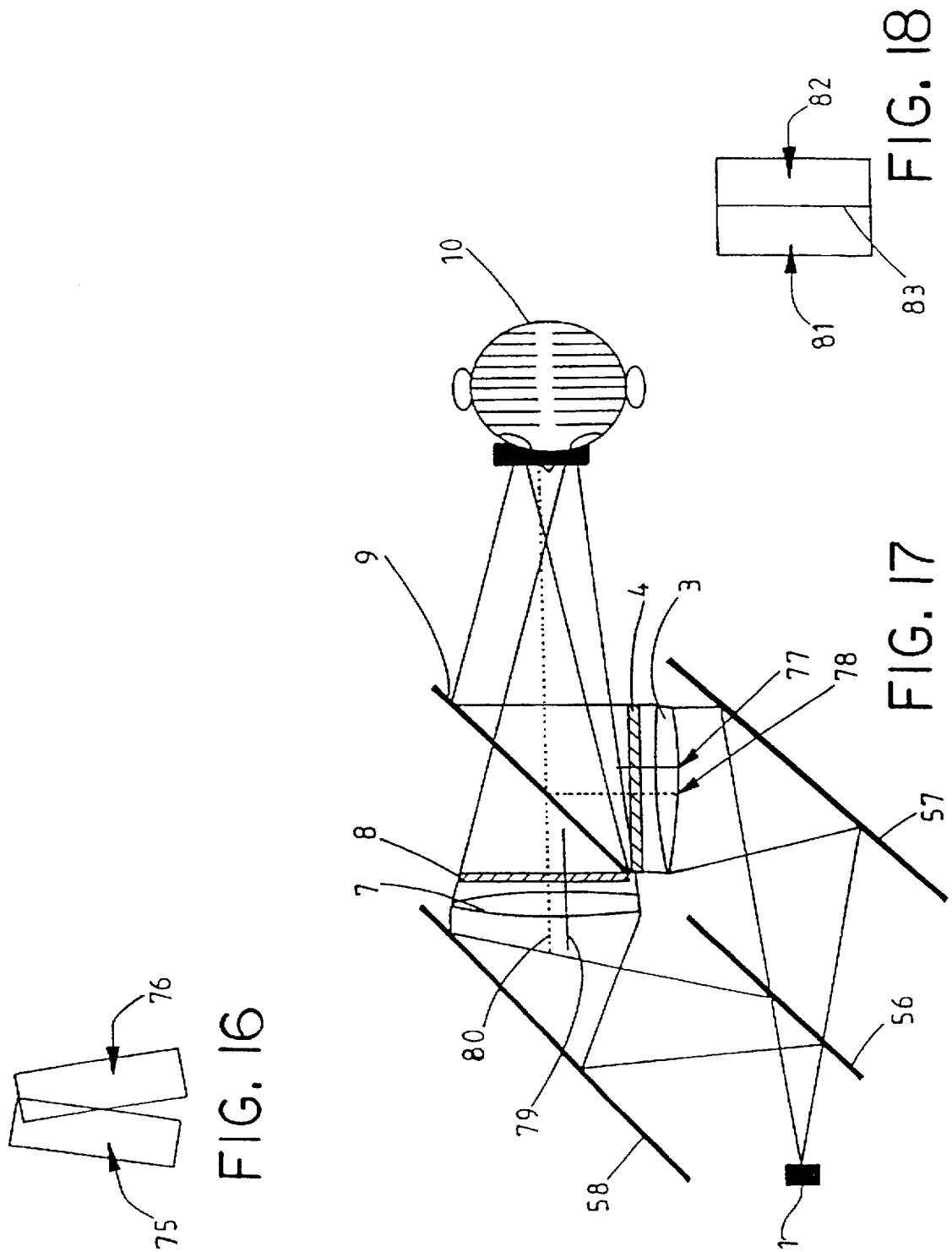

AUTOSTEREOSCOPIC DIRECTIONAL DISPLAY APPARATUS

TECHNICAL FIELD OF THE INVENTION

The present invention relates to autostereoscopic directional display apparatuses. Such apparatuses may be used to convert spatial and/or temporal information into directional information, for instance so as to provide an autostereoscopic three dimensional display.

DESCRIPTION OF THE RELATED ART

Known three dimensional (3D) display apparatuses which can create images of opaque moving objects rely on creating the perception of a 3D image to a human observer by displaying a number of two dimensional (2D) images. Each of the 2D images is a view of the object from a particular direction and is "replayed" in that direction. The accuracy and effectiveness of these 3D images and the maximum display size and freedom of viewer location increase as the number of 2D views displayed increases.

DESCRIPTION OF THE RELATED ART

Two known techniques for providing 3D displays use lenticular methods and time multiplexed or sequential methods. For effective operation, such systems must display a large number of 2D views of an object. In direct view lenticular systems, the maximum number of views is determined by the resolution of a spatial light modulator (SLM) used in the system whereas, in multiple projector systems, the maximum number of views is determined by the number of separate SLM's used. In time multiplexed systems, the frame rate of the SLM determines the maximum number of views.

With known arrangements, to display a large number of views, the maximum frame rates of practical available SLM's are insufficient for time multiplexed displays and the maximum resolution of presently available SLM's is insufficient for direct view lenticular methods. Multiple projector lenticular methods with a large number of SLM's are expensive and bulky. Thus, known 3D display systems are incapable of or inconvenient for accurately providing a moving electronic opaque colour autostereoscopic 3D image from a range of perspectives.

British Patent Application No.9210399.3 discloses time multiplexed and spatially multiplexed systems, and a system which combines spatial and temporal multiplexing to provide a 3D display with a larger number of views. However, the maximum resolution and frame rate of currently available SLM's limit the number of views that can be displayed.

A known 3D display technique uses a beam combiner and polarising techniques to provide a 3D image which is limited to two views. However, this technique is not autostereoscopic but is stereoscopic, i.e. the observer has to wear polarising glasses in order to see the 3D effect.

GB 2 185 825A discloses an autostereoscopic display in which two 2D views are imaged by a concave spherical mirror at the eyes of an observer.

GB 2 066 503A discloses an image protection system which may be used as an autostereoscopic display by projecting 2D views onto a lenticular screen. Images of the 2D views are formed on the faces of cathode ray tubes and are projected by projection lenses. The projected images are combined by a beam splitter and a mirror and are imaged onto the lenticular screen which provides parallax so that different eyes of an observer see different 2D views.

GB 2 206 763A discloses a 3D display in which 2D images are supplied in sequence to a SLM. A controlled light source behind the SLM causes each of the 2D images to be visible from a respective direction corresponding to the direction from which the 2D image was captured.

GB 1 346 915 discloses a directional display device in which arrays of globular lenses are used to permit viewing of spatially multiplexed images in respective directions. By using suitably photographed 2D views and by interlacing elements of the views below the lenses, it is possible to provide an autostereoscopic display.

GB 1 121 097 discloses a 3D picture which is provided by techniques similar to those disclosed in GB 1 346 915 but using concave reflectors instead of the globular lenses.

EP 0 262 955A discloses an autostereoscopic display in which images are formed by controllable light sources, for instance in the form of a liquid crystal display (LCD). A lenticular screen is disposed on the LCD to provide parallax so that two 2D views are seen by respective eyes of an observer.

WO 79/00308 discloses an apparatus for producing a 3D image in which several cathode ray tubes display cross-sections of a scene at different depths. A set of beam splitters and lenses are arranged to stack the 2D images of these cross-sections at different positions along a common optical axis so as to give a representation of a 3D image.

U.S. Pat. No. 4,623,223 discloses an autostereoscopic display in which two 2D views are reflected by plane mirrors onto a spherical concave mirror. The concave mirror forms real images of the 2D views which can be viewed by respective eyes of an observer.

SUMMARY OF THE INVENTION

According to a first aspect of the invention, there is provided an autostereoscopic display apparatus as defined in the appended claim 1.

According to a second aspect of the invention, there is provided an autostereoscopic display apparatus as defined in the appended claim 20.

Preferred embodiments of the invention are defined in the other appended claims.

Such an apparatus may be used as a 3D display apparatus to provide a relatively large number of 2D views. Alternatively, such an apparatus may be used in other applications, for instance to provide a sign displaying different information when viewed in different directions.

It is thus possible to provide optical devices which may be used in direct view display systems and which combine a number of displays of spatially and/or temporally multiplexed type to increase the rate of display of 2D images or views. By increasing the number of views, it is possible to improve the accuracy and appearance of a 3D image. It is also possible to produce a larger range of viewing positions and a large number of separate observers. No viewing aids are necessary to see the 3D effect, i.e. the display is autostereoscopic. Furthermore, known image capture techniques may be used so that colour, movement and opaque images may all be displayed.

BRIEF DESCRIPTION OF THE DRAWINGS

The invention will be further described, by way of example, with reference to the accompanying drawings, in which:

FIGS. 15a to 15c illustrate operation of the display of FIG. 14;

FIG. 16 illustrates the appearance of tilted viewing windows produced by the display of FIG. 11;

FIG. 17 is a diagrammatic plan view of a 3D display using a single illumination arrangement and constituting an eleventh embodiment of the invention;

FIG. 18 illustrates the appearance of viewing windows produced by the display of FIG. 17;

DETAILED DESCRIPTION OF THE PREFERRED EMBODIMENTS

Figure 1:
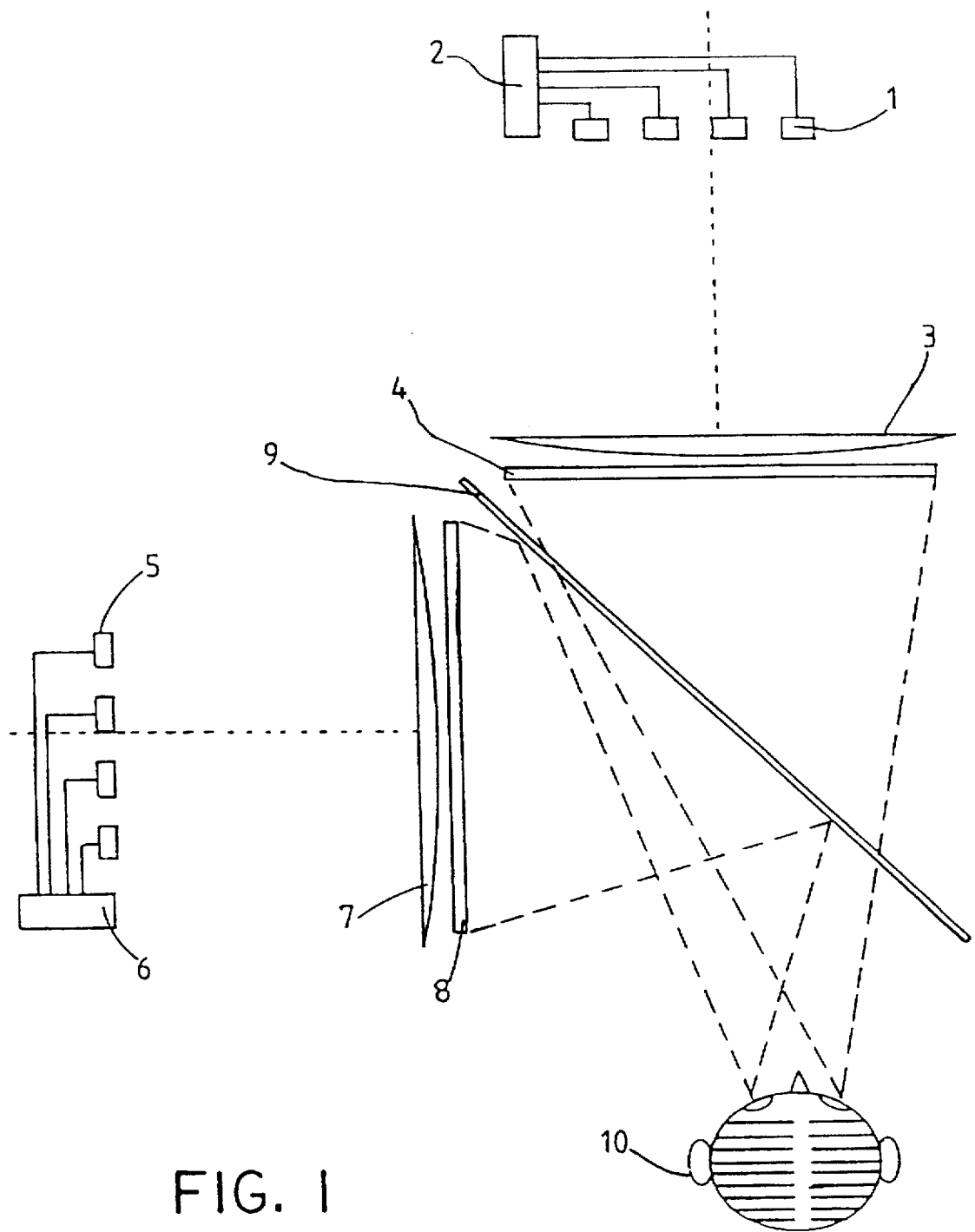
FIG. 1 is a diagrammatic plan view of a 3D display using temporal multiplexing and constituting a first embodiment of the invention.

Like reference numerals refer to like parts throughout the drawings.

The 3D display shown in FIG. 1 comprises a first autostereoscopic display arrangement comprising a plurality of light sources 1 and a control circuit 2 for sequentially illuminating the light sources 1. Four light sources 1 are shown spaced apart laterally with a pitch which is substantially equal to the lateral width of each of the light sources 1. An optical system shown in the drawing as a lens 3 is disposed between the light sources 1 and a spatial light modulator (SLM) 4. Alternatively, the SLM 4 may be disposed between the light sources 1 and the lens 3 and adjacent the lens 3.

The SLM 4 may comprise a liquid crystal device and is arranged to display a plurality of 2D views in sequence such that each view is illuminated by a respective one of the light sources 1. The 2D views are thus visible from different angles corresponding to the angles at which the views were recorded during image capture.

The display further comprises a second autostereoscopic display arrangement comprising a plurality of light sources 5, a control circuit 6, a lens 7, and an SLM 8 which are substantially identical to the light sources 1, the control circuit 2, the lens 3, and the SLM 4, respectively.

Figure 2:
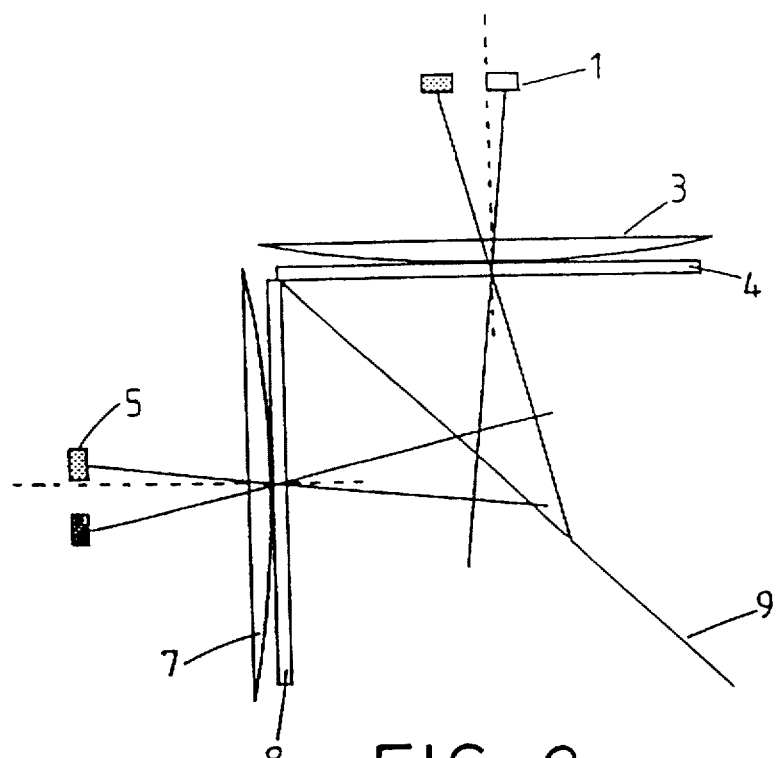
FIGS. 2 and 3 are diagrammatic plan views illustrating operation of the display of FIG. 1.
Figure 3:
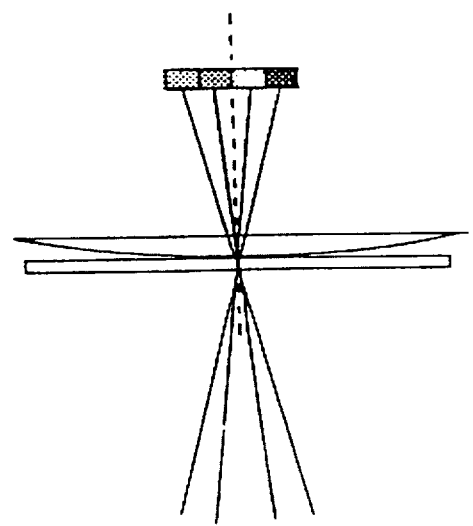

The views from the two temporally multiplexed display arrangements are combined by means of an optical combining system shown in the drawing as a beam splitter 9. The views reproduced by the SLM 4 are transmitted through the beam splitter 9 towards an observer 10 whereas the views from the SLM 8 are reflected by the beam splitter 9 towards the observer 10. FIG. 2 illustrates the directions in which the views from the two temporally multiplexed display arrangements are projected towards the beam splitter 9. FIG. 3 shows the apparent light source positions and directionality as perceived by the observer 10 via the beam splitter 9 as shown in FIG. 1. Each 3D image component fills a defined range of image output angles with the components from the two display arrangements being interlaced with each other so that a laterally continuous spread of light emerges from the display. A reconstruction of the 3D image is thus observed over a continuous range of angles by a suitably positioned observer 10.

The 2D images reproduced by means of the SLM 8 are laterally inverted by the beam splitter 9. Compensation for this may be provided by laterally inverting the 2D views in the SLM 8.

The beam splitter 9 may comprise any device or system which is capable of performing the optical combining function. For instance, the beam splitter 9 may comprise a partially silvered mirror. Alternatively, in order to reduce the absorption of incident light caused by metallic coatings, all-dielectric non-polarising coatings may be used. However, such coatings are usually designed for particular wavelengths and may thus be of limited application. A hybrid metal-dielectric coating combines the benefits of metals and dielectrics to provide a beam splitter of moderate absorption, low polarisation sensitivity, and good broadband spectral flatness.

Figure 4:
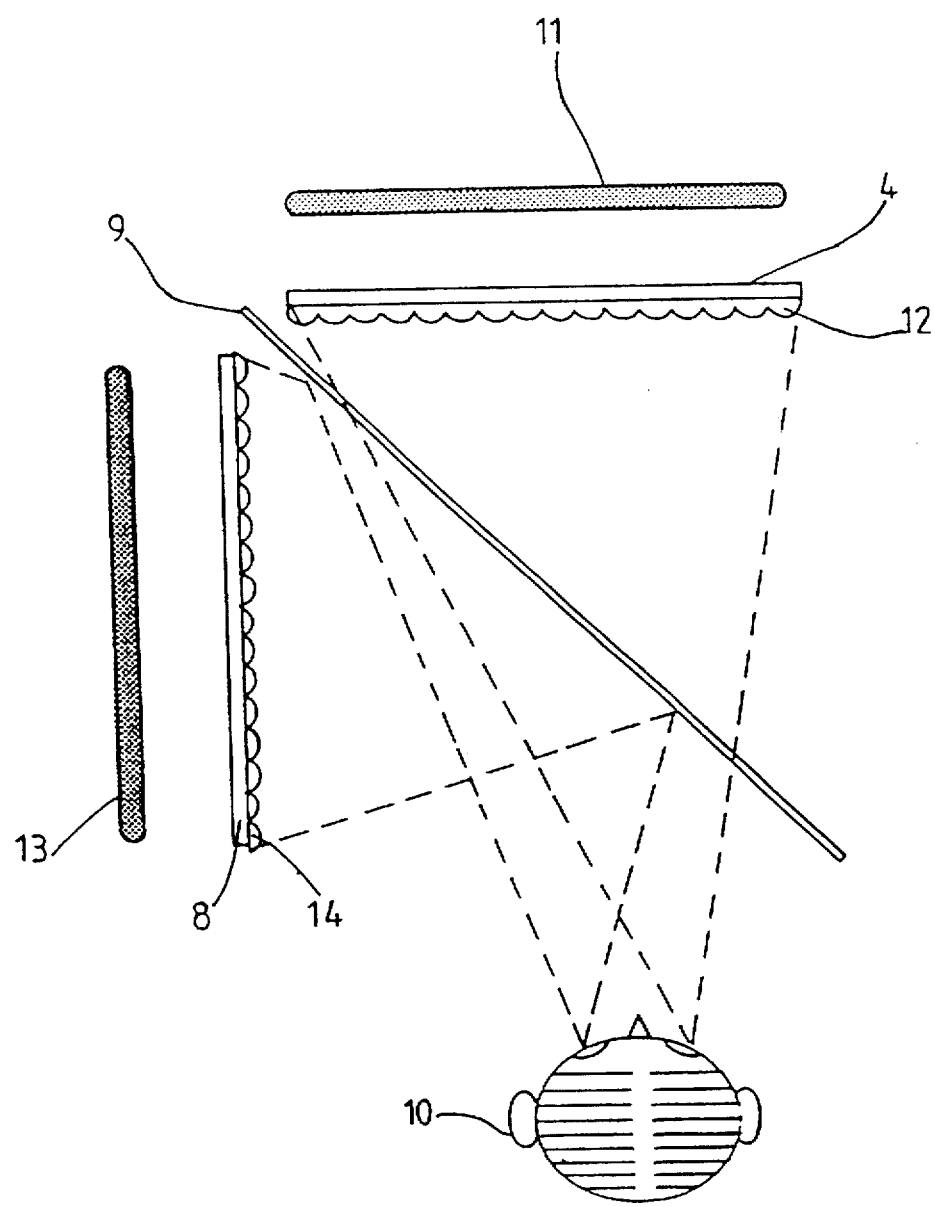
FIG. 4 is a diagrammatic plan view of a 3D display using spatial multiplexing and constituting a second embodiment of the invention.

FIG. 4 shows a display which comprises two spatially multiplexed display arrangements in place of the temporally multiplexed display arrangements of FIG. 1. The SLM's 4 and 8, the beam splitter 9, and the observer 10 correspond to those shown in FIG 1. However, the SLM 4 is illuminated by means of a diffuse light source 11 and the modulated light emerging from the SLM 4 passes through a lenticular screen 12 which comprises a plurality of plano-cylindrical converging lenticules disposed with a regular lateral pitch. Similarly, a diffuse light source 13 and a lenticular screen 14 are provided for the SLM 8.

Figure 5:
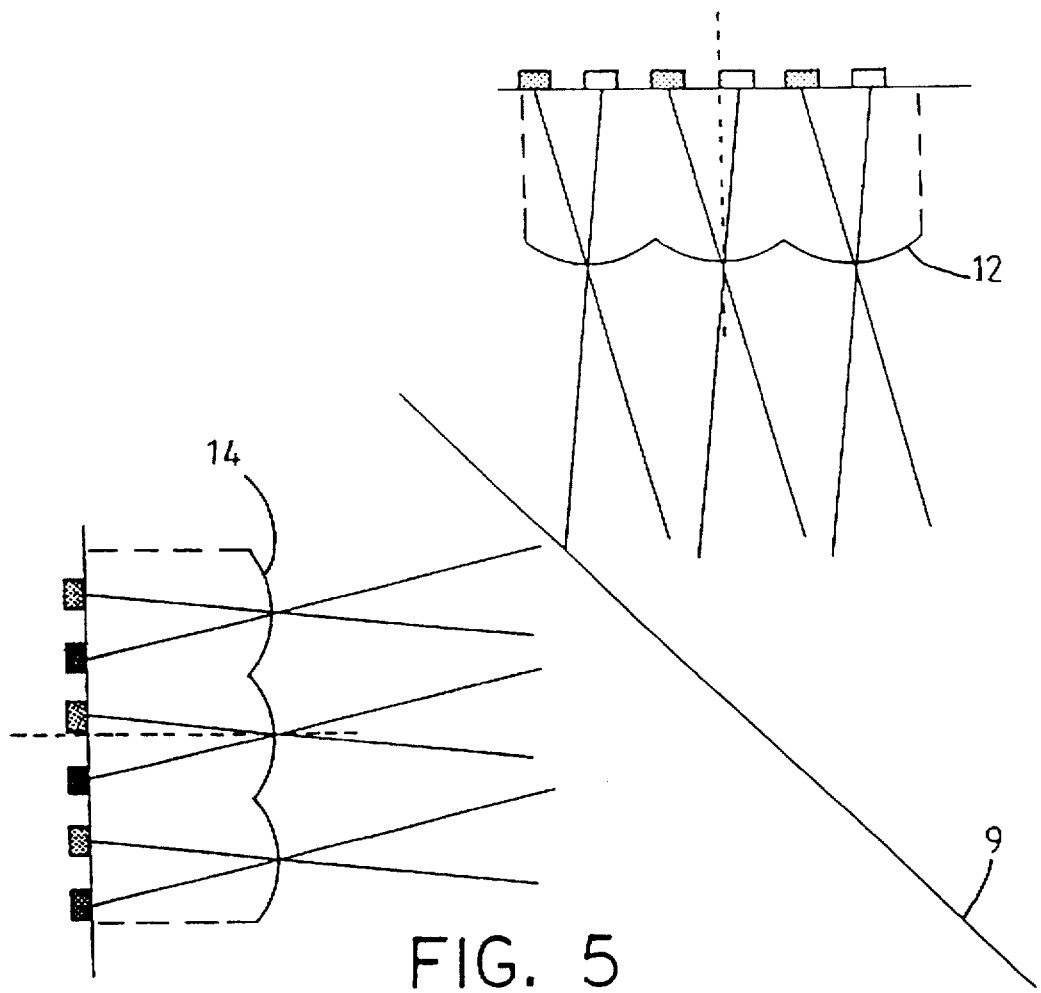
FIGS. 5 and 6 are diagrammatic plan views illustrating operation of the display of FIG. 4.
Figure 6:
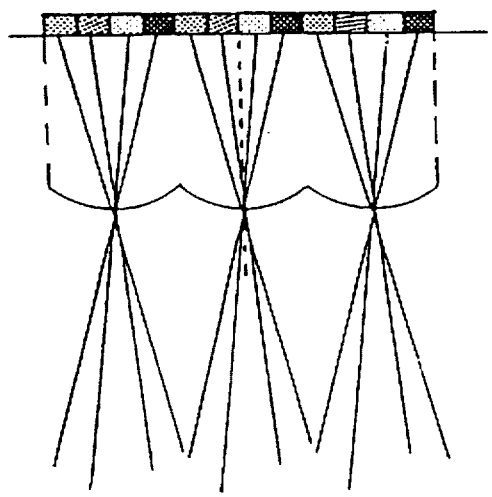

Each of the SLM's 4 and 8 simultaneously produces a plurality of interlaced 2D views made up of thin vertical picture elements. A plurality of such picture elements from different views is displayed behind each of the lenticules of the screens 12 and 14 as illustrated in FIG. 5. These views are combined by the beam splitter 9 so as to give an apparent picture element position and directionality as illustrated in FIG. 6. Thus, as in the embodiment of FIG. 1, the reconstructed 3D image is observed over a continuous range of angles by a suitably positioned observer.

Figure 7:
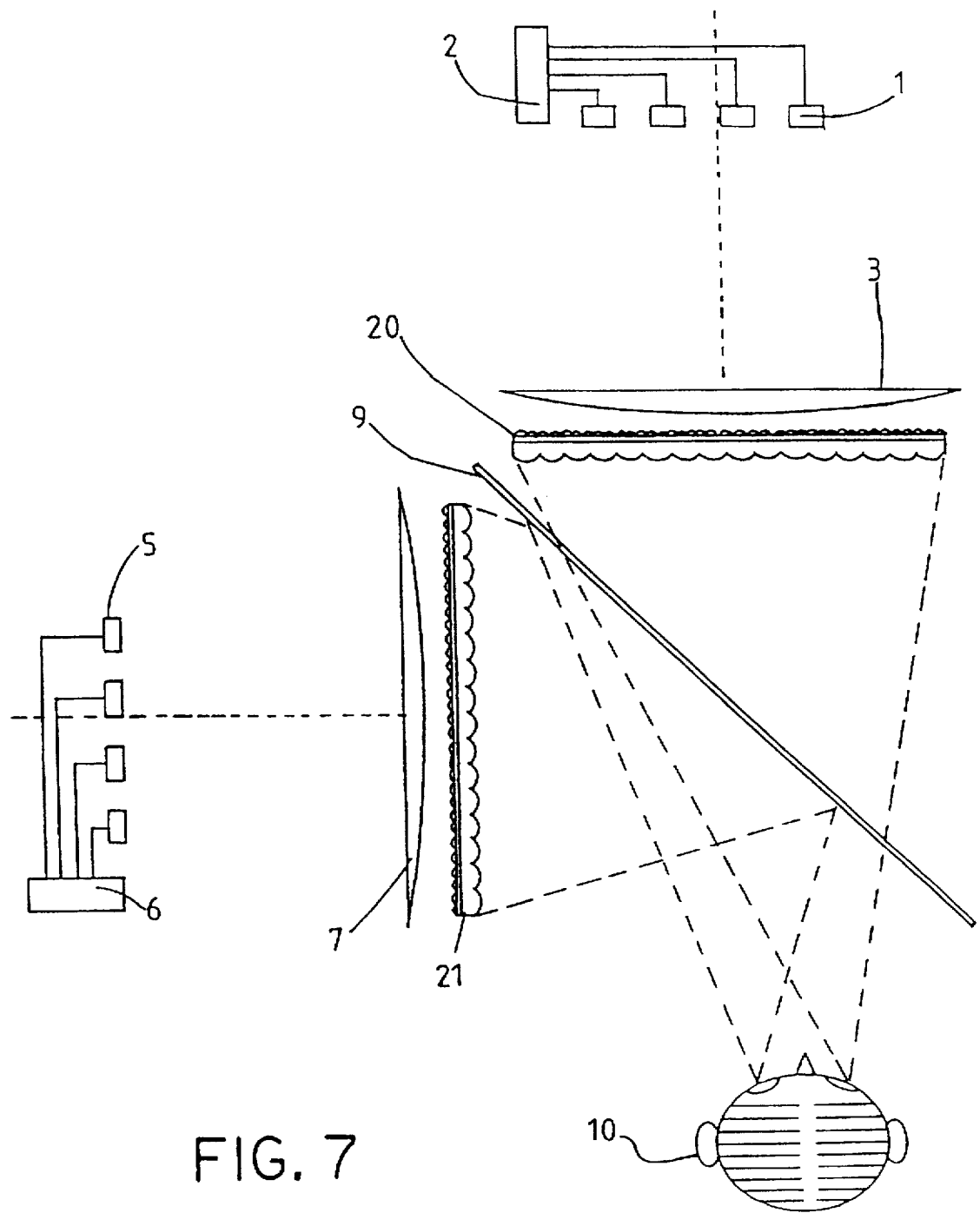
FIGS. 7 and 8 are diagrammatic plan views of 3D displays using temporal and spatial multiplexing and constituting third and fourth embodiments, respectively, of the invention.

In order to increase the number of available views, the techniques of spatial and temporal multiplexing may be combined as illustrated in the display of FIG. 7. The light sources 1 and 5, the control circuits 2 and 6, the lenses 3 and 7, and the beam splitter 9 are the same as shown in FIG. 1. However, the SLM's 4 and 8 of FIG. 1 are replaced by hybrid sandwiches 20 and 21 of the type disclosed in British Patent Application No. 9210399.3. For instance, each of the hybrid sandwiches comprises a first lenticular screen having a first lenticular pitch, an SLM, a diffuser, and a second lenticular screen having a second lateral pitch which is greater than the first pitch. The pitch of the second lenticular screen is substantially equal to an integer multiple of the pitch of the first screen.

The light sources 1 and 5 are illuminated sequentially by the control circuits 2 and 6 and image information is supplied sequentially to the SLM's of the hybrid sandwiches 20 and 21 in synchronism with the illumination. Each "frame" of image information supplied to the SLM's comprises a plurality of images which are spatially multiplexed as described with reference to the embodiment of FIG. 4. The individual 2D views are therefore reproduced over angular ranges in directions which correspond to the directions from which the views were recorded during image capture and the beam splitter 9 combines the views so that the observer 10 can observe the 3D image over a continuous range of angles.

Figure 8:
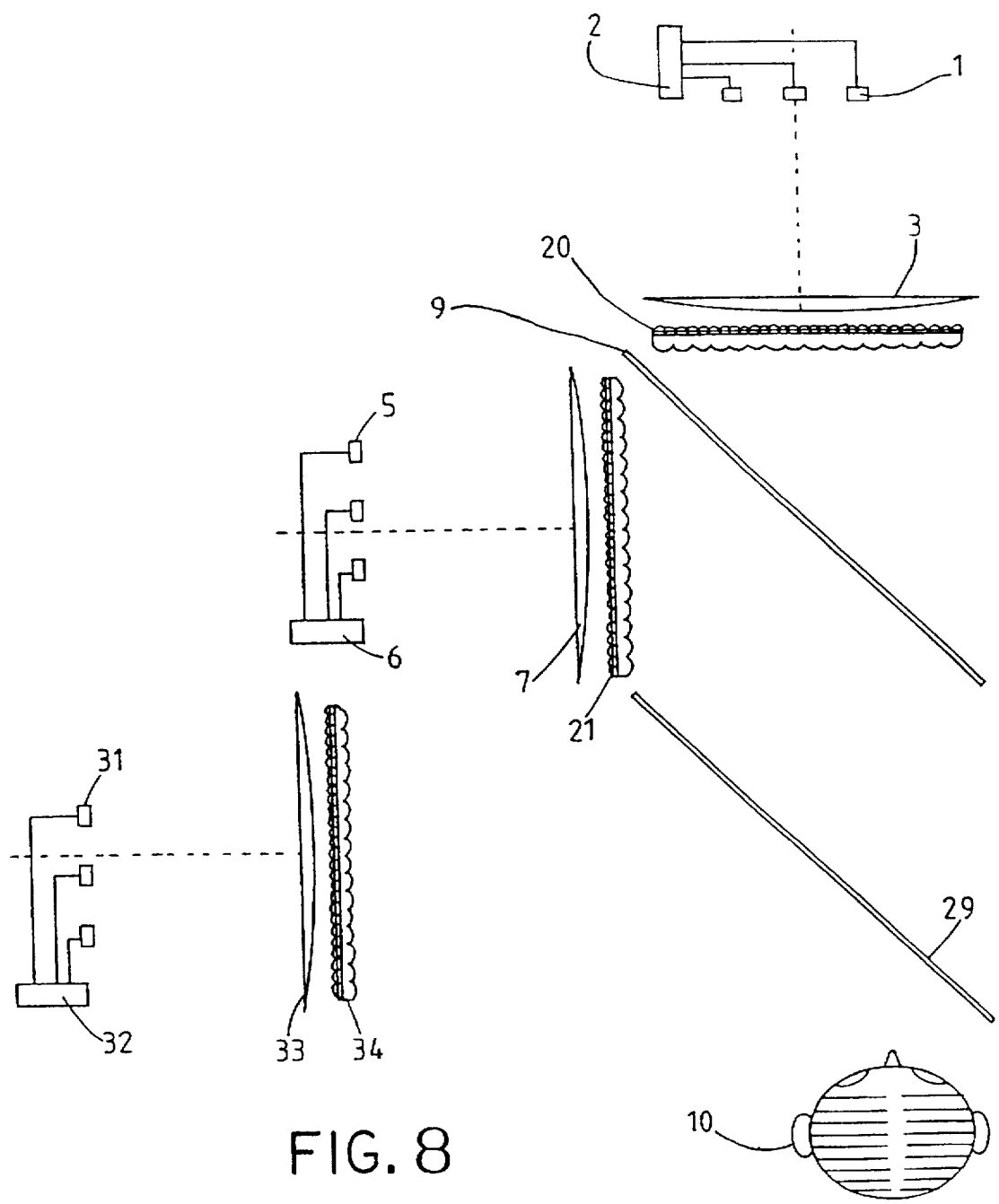

The displays shown in FIGS. 1 to 7 each comprise a single beam splitter 9 co-operating with two display arrangements to increase the number of 2D views which can be provided to form a composite 3D image. However, a plurality of beam splitters may be provided and the display shown in FIG. 8 comprises two beam splitters 9 and 29 with three display arrangements of the combined spatial and temporal multiplexing types shown in FIG. 7. The third display arrangement comprises light sources 31, a control circuit 32, a lens 33, and a hybrid sandwich 34 which are substantially identical to the light sources 1, the control circuit 2, the lens 3, and the hybrid sandwich 20, respectively. The views from the hybrid sandwich 20 are transmitted directly through the beam splitters 9 and 29 to the observer 10. The views from the hybrid sandwich 21 are reflected by the beam splitter 9 and transmitted through the beam splitter 29 to the observer 10. The views from the hybrid sandwich 34 are reflected by the beam splitter 29 towards the observer 10. It is therefore possible to provide a larger number of 2D views to form the composite 3D image.

Figure 9:
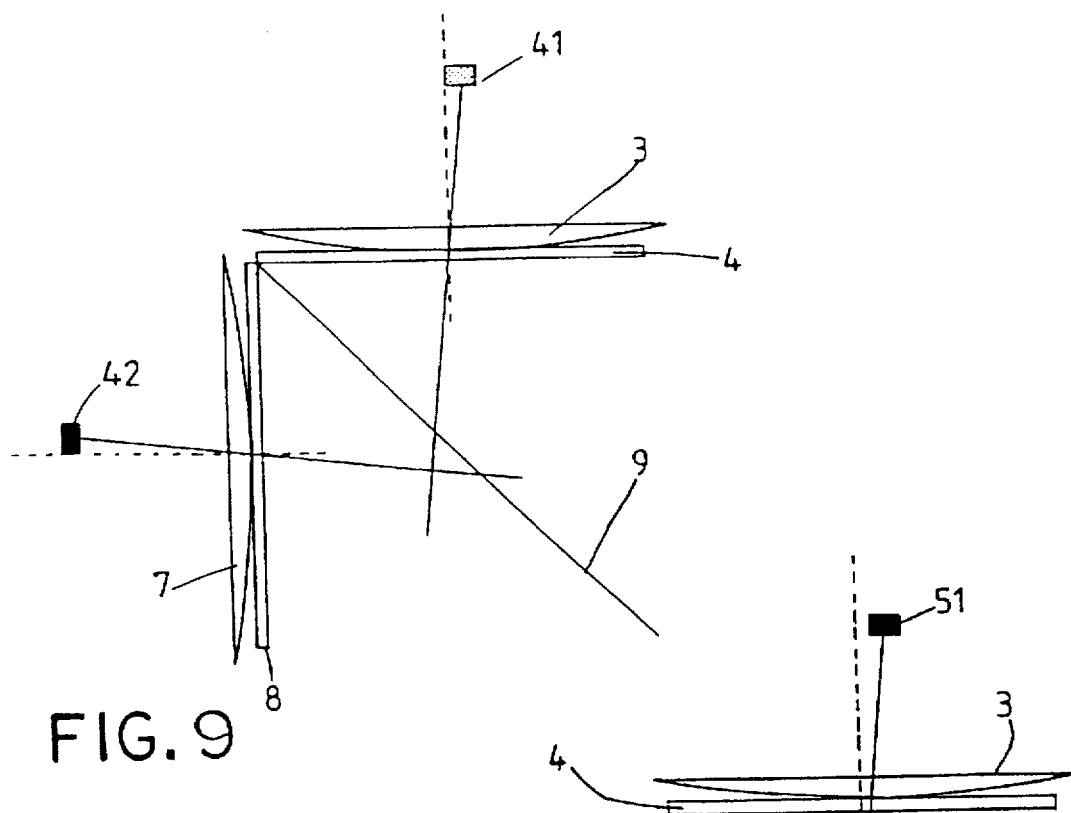
FIGS. 9 and 10 are diagrammatic plan views of 3D displays constituting fifth and sixth embodiments, respectively, of the invention.

FIG. 9 shows a 3D display of relatively simple type for providing two views. The display of FIG. 9 resembles that of FIG. 1 but differs in that the light sources 1 and 5 and the control circuits 2 and 6 are replaced by continuously illuminated light sources 41 and 42.

Figure 10:
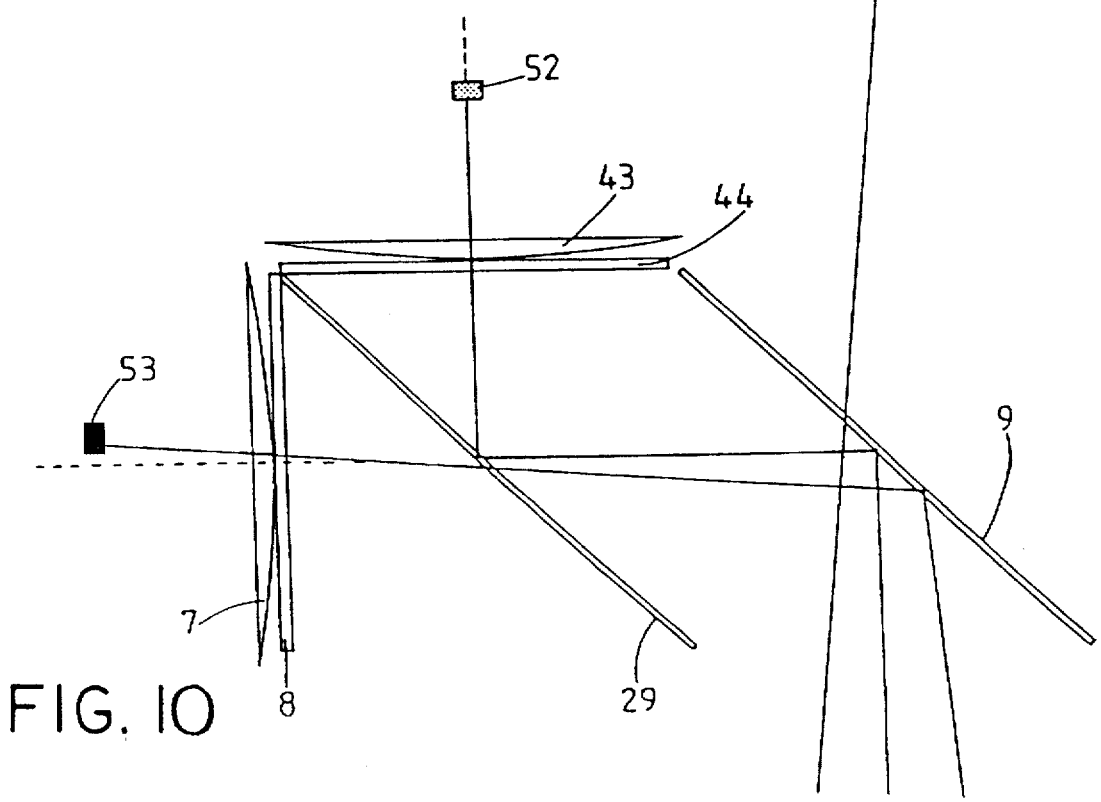

FIG. 10 shows a 3D display which is similar to that of FIG. 9 but which includes a further beam splitter 29, lens 43, and SLM 44. The display of FIG. 10 has three continuously illuminated light sources 51, 52, and 53 and provides three views. The light sources 51, 52, and 53 are arranged such that the light source 52 is on the axis of the lens 43 whereas the light sources 51 and 53 are displaced from the axes of the lenses 3 and 7, respectively, so that the light beams leaving the beam splitter 9 are laterally contiguous with each other.

Figure 11:
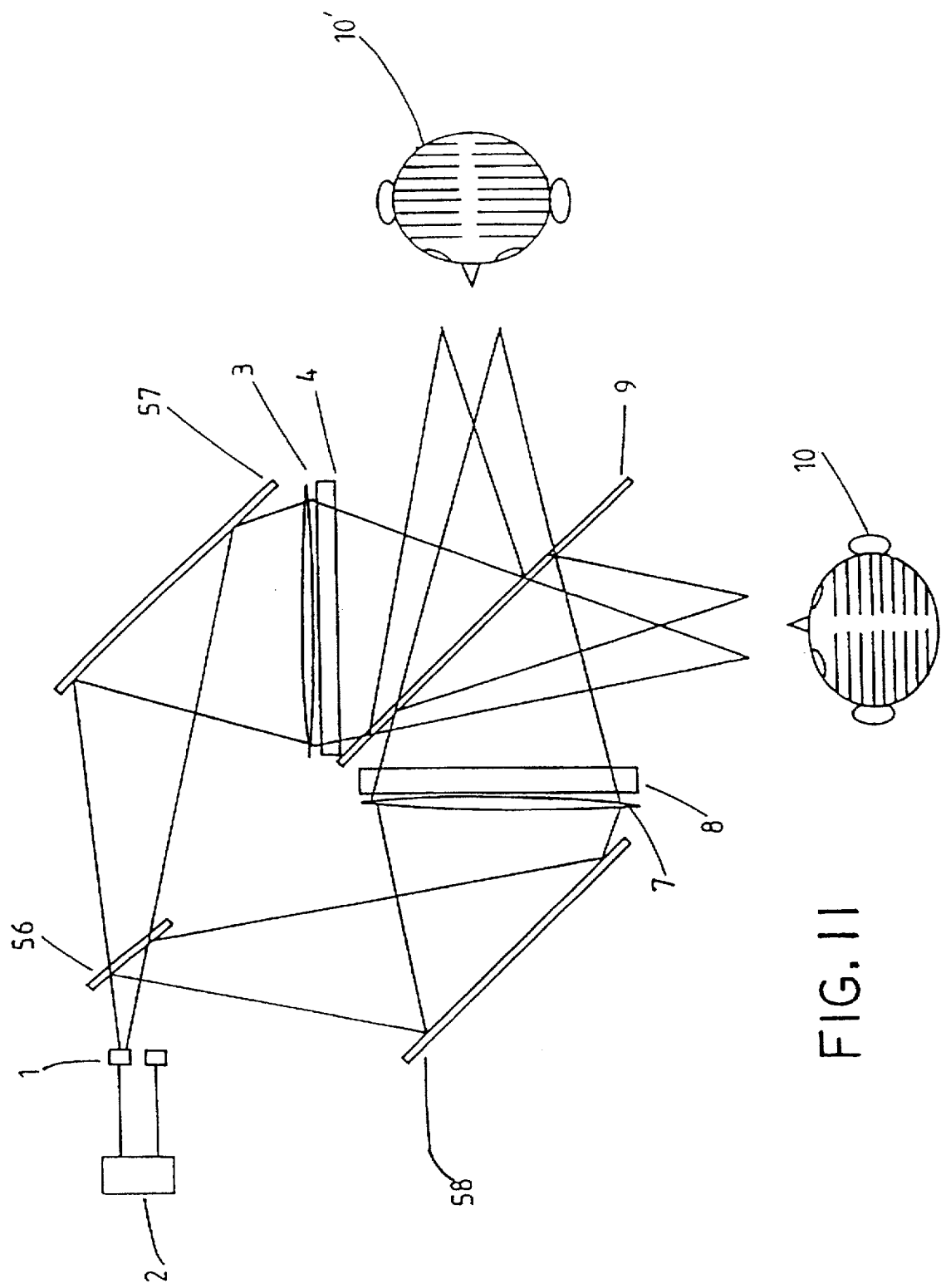
FIG. 11 is a diagrammatic plan view of a 3D display using a single illumination arrangement and constituting a seventh embodiment of the invention.

The display shown in FIG. 11 differs from that shown in FIG. 1 in that the light sources 5 and the control circuit 6 are omitted and a beam splitting arrangement is provided so as to divide the light from the light sources 1 (only two shown in FIG. 11) so as to illuminate both SLM's 4 and 8. Light from the light sources 1 is divided by a beam splitter 56, for instance of the same type as the beam splitter 9, into a transmitted beam and a reflected beam. The transmitted beam is reflected by a mirror 57 towards the lens 3 (for instance of the Fresnel type) and the SLM 4. The reflected beam is reflected by a mirror 58 towards the lens 7 and the SLM 8. The beam splitter 56 is arranged to divide the light into the two beams of equal intensities. The mirrors 57 and 58 are not exactly parallel; one is at a slight angle, for instance approximately 5°, with respect to the other. Thus, each light source 1 gives rise to two apparent light sources being imaged at the eyes of the observer 10 with the appropriate interocular separation therebetween after recombination by the beam splitter 9.

This arrangement provides a simplified display by eliminating one control circuit and set of light sources. Further, problems associated with matching the light sources 1 and 5 of FIG. 1 in terms of colour matching are avoided. The total size and complexity of the display can also be reduced by adopting the single illumination system shown in FIG. 11.

A disadvantage of the display shown in FIG. 11 compared with that of FIG. 1 is that half the amount of light is provided because half the number of sources are provided. This can be compensated by means of the embodiment shown in FIG. 12. The display of FIG. 12 differs from that of FIG. 11 in that the beam splitter 56 is of the polarising type and divides the light into two orthogonal polarization components as indicated by the arrows 39 and 60. The SLM's 4 and 8 are of the liquid crystal display (LCD) type incorporating polarizer sheets which are arranged to be orthogonal to each other. Further, the beam splitter 9 is of the polarization sensitive type, so that substantially all of the light propagating through the apparatus is directed towards the observer 10.

Figure 12:
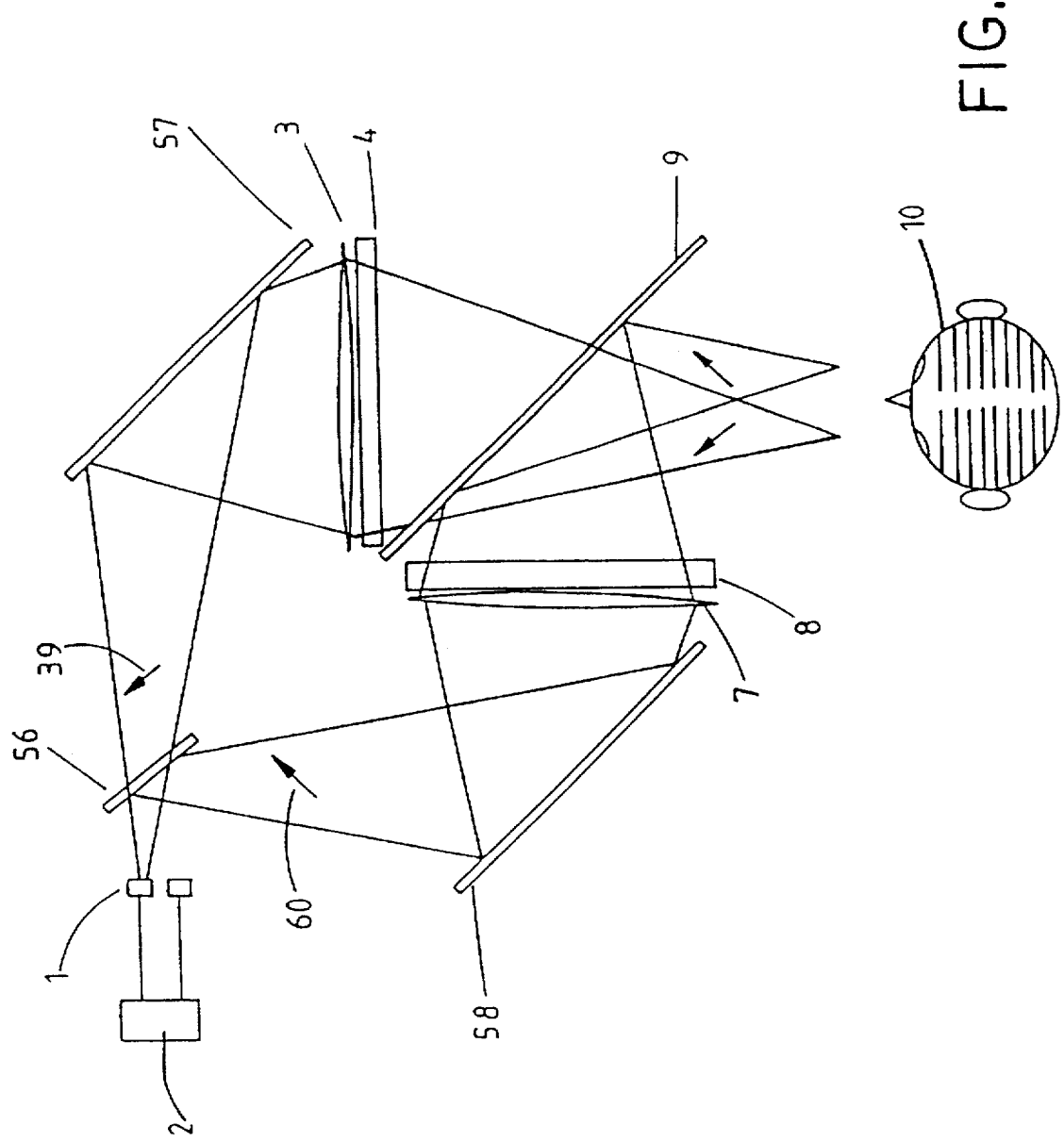
FIG. 12 is a diagrammatic plan view of a display of the type shown in FIG. 11 modified to form an eighth embodiment of the invention.

The display shown in FIG. 12 can be viewed only from the direction of the observer 10, whereas the display of FIG. 11 can also be viewed from the observer position indicated at 10'. For many applications, this is not a disadvantage whereas the increased brightness provided by the display of FIG. 12 is an advantage.

The embodiments of FIGS. 11 and 12 may be modified by omitting the control circuit 2 and providing a single light source 1 so as to provide two 2D views.

Figure 13:
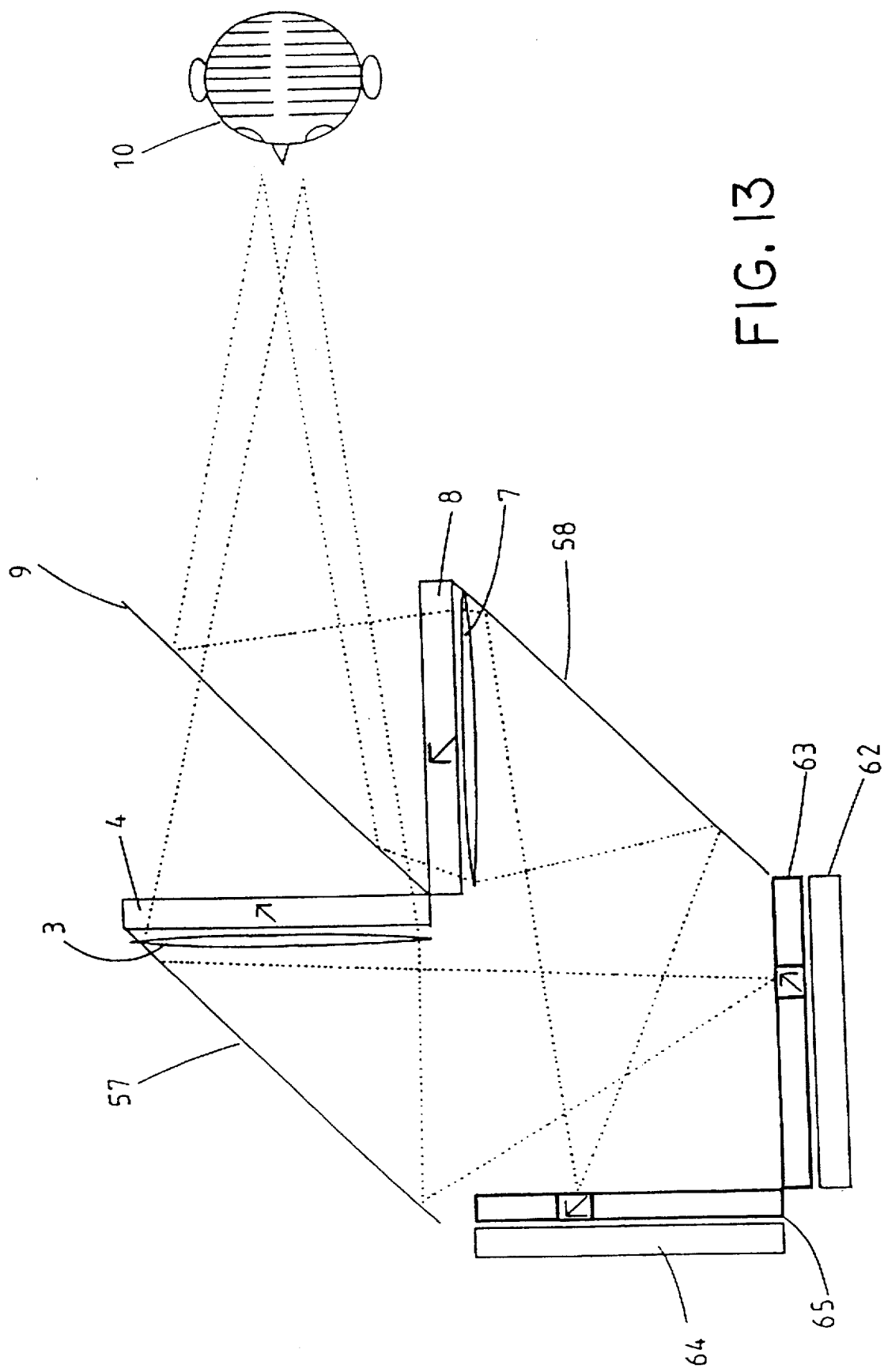
FIG. 13 is a diagrammatic plan view of a 3D display using folded tight paths and constituting a ninth embodiment of the invention.

The display shown in FIG. 13 is similar to the display shown in FIG. 1 but employs folded light paths for illuminating the SLM's 4 and 8 using mirrors 57 and 58 arranged as shown in FIG. 11. The display of FIG. 13 further differs from that shown in FIG. 1 in that the light sources 1 and 5 are replaced by diffuse light sources 62 and 64 disposed behind LCD shutters 63 and 65. The shutters are controlled by a control circuit of the type shown at 2 and 6 in FIG. 1 and operating in the same way so as to provide effectively a plurality of light sources which are illuminated in turn.

By folding the light paths from the light sources to the SLM's 4 and 8 as shown in FIG. 13, it is possible to provide a relatively compact display. By using two light sources, the brightness of the display can be increased with respect to the display shown in FIG. 11.

The LCD shutters 63 and 65 may be of the ferroelectric liquid crystal, twisted nematic, or super-twisted nematic type so as to provide light of polarizations which match input polarizers of the SLM's 4 and 8, respectively. For instance, the output polarization of the shutter 63 and the input polarization of the SLM 4 may be −45° whereas the output polarization of the shutter 65 and the input polarization of the SLM 8 may be +45°. Such an arrangement minimizes the light loss occurring because of the use of LCD shutters.

Figure 14:
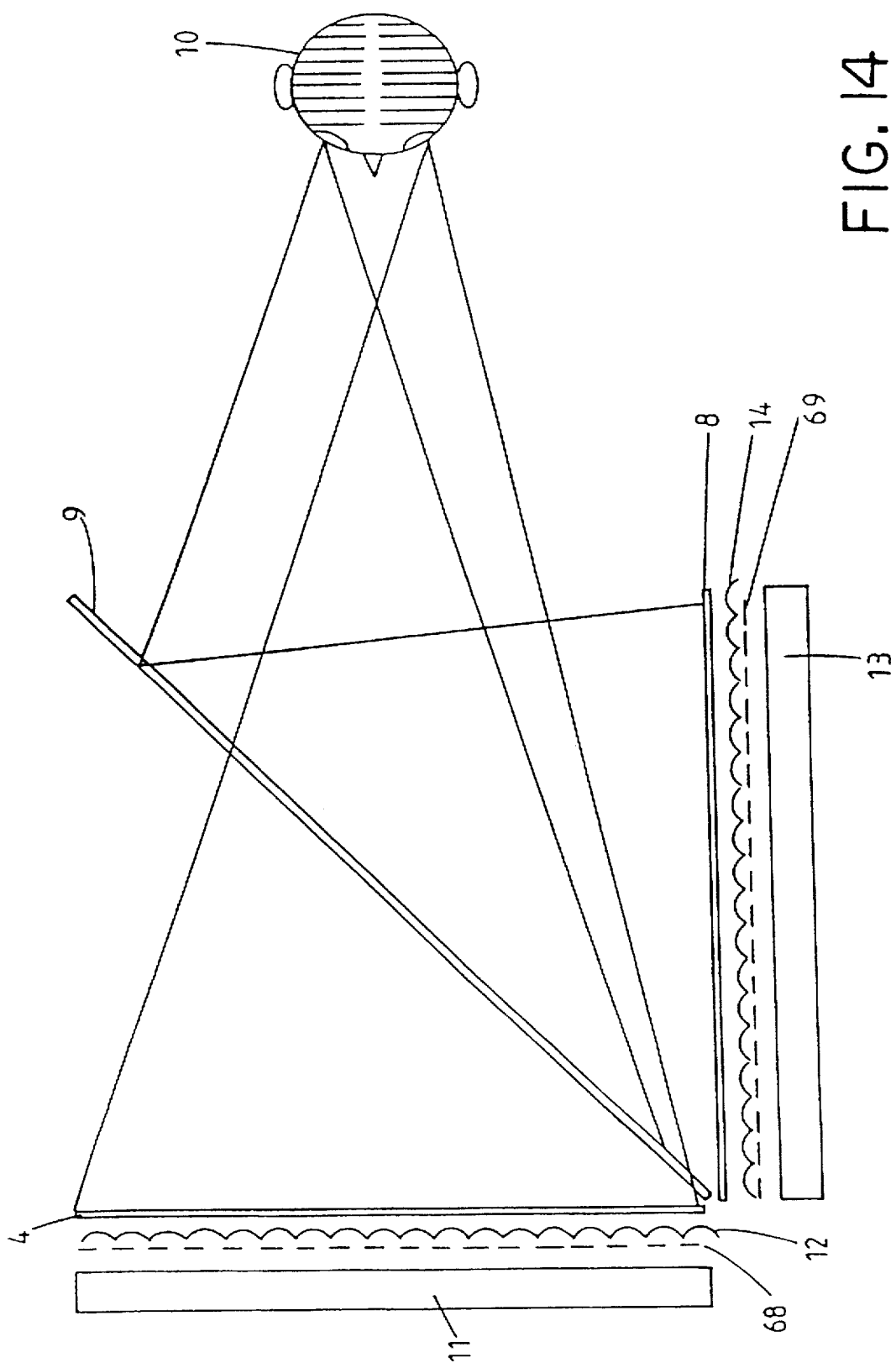
FIG. 14 is a diagrammatic plan view of a 3D display having a compact illumination system and constituting a tenth embodiment of the invention.

The display shown in FIG. 14 resembles that shown in FIG. 4 in that it comprises SLM's 4 and 8, a beam combiner 9, diffuse light sources for instance in the form of light boxes 11 and 13, and lenticular screens 12 and 14. However, the display of FIG. 14 differs from that of FIG. 4 in that the lenticular screens 12 and 14 are disposed between the SLM's 4 and 8 and the light sources 11 and 13 and in that parallax barriers 68 and 69 are disposed in the object planes of the lenticular screens 12 and 14, respectively in the arrangement shown in FIG. 14 employing two SLM's 4 and 8, the parallax barriers 68 and 69 have mark/space ratios of 1:1 i.e. the barriers comprise parallel slits whose widths are equal to the opaque strips defining the slits.

Operation of the display shown in FIG. 14 is illustrated in FIGS. 15a to 15c. FIG. 15a illustrates the light beams 70 produced by a typical lenticule of the screen 12. Light emanating from four of the slits of the parallax barrier 68 adjacent the lenticule are imaged by the lenticule at observer locations. FIG. 15b is a similar view showing the light beams 71 produced by the lenticular screen 14. Again, the slits of the barrier 69 are imaged at observer locations.

The positions of the slits of the parallax barriers 68 and 69 in relation to the lenticular screens 12 and 14 are such that the beam combiner 9 produces a light output pattern as illustrated in FIG. 15c. Thus, the light beams 70 and 71 are interlaced with each other and the slits of the parallax barriers 68 and 69 are imaged at the observer locations with an effective pitch 72 equal to the average interocular separation.

The illumination system of the display of FIG. 14 is compact and therefore permits a relatively compact display to be provided. Furthermore, the design of the lenticular screens 12 and 14 is substantially independent of that of the SLM's 4 and 8. In particular, the pitches of the lenticules of the screens 12 and 14 may be much greater than the pitches of the pixels of the SLM's 4 and 8, thus relieving potential problems with Moire fringing, loss of alignment, and manufacturing tolerances of the lenticular screens. For example, the lenticular screens may have a pitch of 3 mm and the parallax barriers may have a pitch of nominally 3 mm with 1.5 mm black stripes spaced in the object plane of the screens such that an image of each parallax barrier is formed at the observer 10. The actual pitch of the parallax barrier is controlled so that "windows" are generated at the observer 10 from the entire screen.

As in the case of the other embodiments of the invention, the lenticular screens may be replaced by microlens screens to provide both vertical and horizontal parallax.

The display shown in FIG. 11 has a single illumination arrangement, which may comprise one light source 1 as shown in FIG. 17 or a plurality of light sources as shown in FIG. 11, and together with the beam splitter 36 generates two apparent illumination arrangements. The images of the illumination arrangements have to be split in order for the observer 10 to see two "windows", each modulated by a respective SLM 4 or 8. The arrangement shown in FIG. 11 achieves this by providing relative tilts between the mirrors 57 and 58. However, such an arrangement provides windows as shown at 75 and 76 for the left and right eyes of the observer in FIG. 16. The windows 75 and 76 abut at one height, above which they overlap and below which there is a dark space therebetween. This can cause unwanted artifacts in the perceived 3D image.

FIG. 17 shows a display which is similar to that shown in FIG. 11. However, the display of FIG. 17 provides a single light source 1 and each of the SLM's 4 and 8 provides a single view. Further, the mirrors 57 and 58 are parallel to each other. In FIG. 11, the axis of each lens 3 and 7 and the axis of the respective display coincide. However, in the display of FIG. 17, the axis 77 of the lens 3 is laterally displaced from the display axis 78 and the axis 79 of the lens 7 is laterally displaced from the display axis 80 in order to split the images of the illuminator 1 at the observer 10. This provides windows 81 and 82 which, as shown in FIG. 18, are parallel to each other and, by appropriate choice of geometry, can be made to be contiguous along their adjacent edges 83.

Although the display of FIG. 17 has a single light source 1 and provides two views, it may have a plurality of light sources and provide more than two views as in the case of the display of FIG. 11. Similarly, the display of FIG. 11 may be modified to have a single light source and to provide two views.

Figure 19:
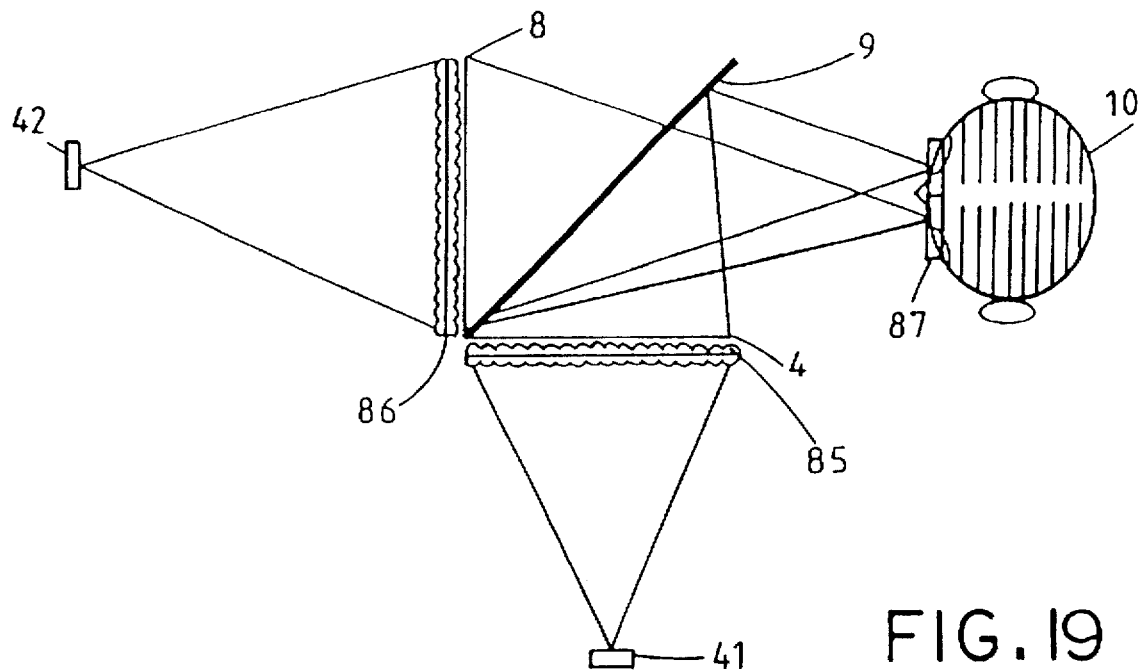
FIG. 19 is a diagrammatic plan view of a 3D display using autocollimating screens and constituting a twelfth embodiment of the invention.
Figure 20:
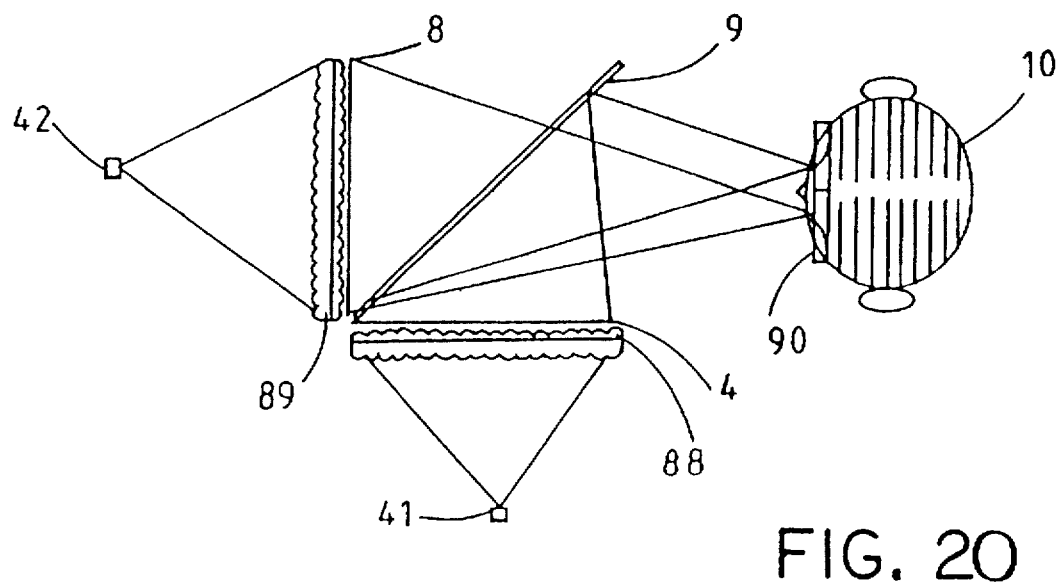
FIG. 20 is a diagrammatic plan view of a 3D display using angular amplifying screens and constituting a thirteenth embodiment of the invention.

FIGS. 19 and 20 show displays of the type shown in FIG. 9 but which the lenses 3 and 7 replaced by alternative optical elements. In the display of FIG. 19, the lenses are replaced by autocollimating screens 85 and 86. Each autocollimating screen comprises an array of lenticules or microlenses of equal focal length. In particular, the screens 85 and 86 each comprise first and second lenticular screens or microlens arrays having plain surfaces which abut against each other and with the focal lengths of the lenticules or lenses being the same. Thus, the autocollimating screens 85 and 86 are optically equivalent to the lenses 3 and 7 in the display of FIG. 9. Accordingly, the windows 87 produced by imaging the light sources 41 and 42 at the observer 10 are of substantially the same size as the light sources 41 and 42.

In the display shown in FIG. 20, the autocollimating screens are replaced by angular amplifying screens 88 and 89. Each of the screens 88 and 89 comprises first and second screens of the same types as for the screens 85 and 86 in FIG. 19, but with the screen nearer the respective light source having a larger focal length than that of the screen nearer the SLM. The effect of substituting the angular amplifying screens 88 and 89 for the autocollimating screens 85 and 86 is to produce windows 90 at the observer which are larger than the light sources 41 and 42.

Each of the screens 85, 86, 88, and 89 may have a diffuser located between the arrays of lenses or lenticules. Also, the light sources 41 and 42 may be replaced by a plurality of light sources of the type shown at 1 and 5 in FIG. 1 and the SLM's 4 and 8 may provide temporally multiplexed views. Further, the autocollimating screens or angular amplifying screens may be substituted in place of the lenses 3 and 7 in any of the other embodiments described herein and shown in the accompanying drawings. The use of angular amplifying screens allows the use of smaller light sources or smaller illumination shutter SLM's where such devices define the light sources, and may have advantages in terms of cost and compactness.

Figure 21:
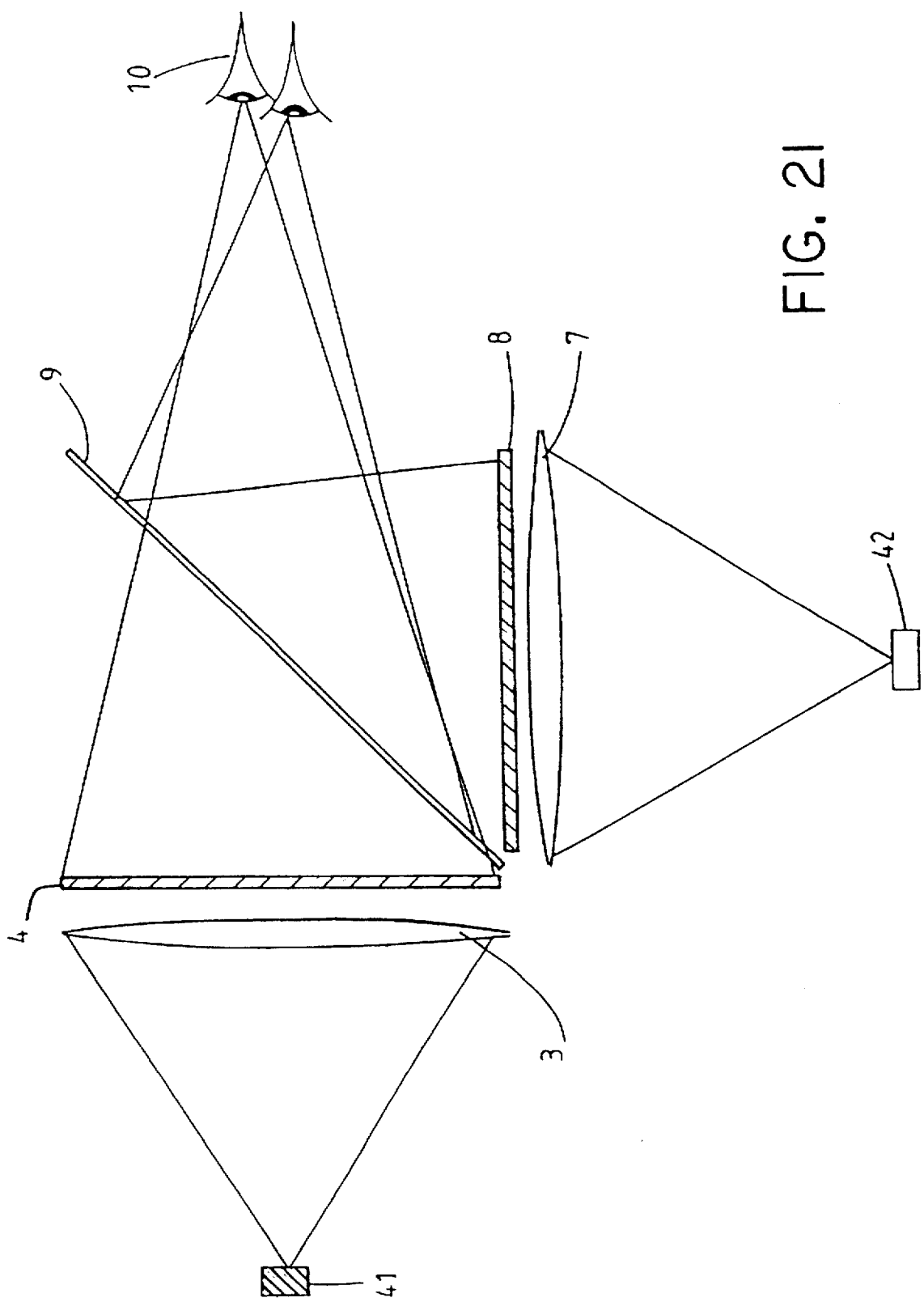
FIG. 21 is a diagrammatic side view of a 3D display constituting a fourteenth embodiment of the invention.

The display shown in FIG. 21 is of the same type as the display shown in FIG. 9. However, the display of FIG. 21 differs in the orientation of the various elements. Thus, the SLM 4 is arranged vertically whereas the SLM 8 is arranged horizontally, as opposed to the display of FIG. 9 and all of the other embodiments in which the SLM's are all arranged vertically. Similarly, one or more of the SLM's in all of the other embodiments may be arranged horizontally, should such a configuration be preferable in any application.

Displays of the type shown in the drawings may be used in 3D television, 3D computer aided design and graphics, 3D medical imaging, virtual reality, and computer games. By providing an increased number of 2D views to make up the 3D image, the accuracy and effectiveness of the 3D images can be increased and the maximum display sizes and freedom of viewer location can be increased. Further, moving opaque colour autostereoscopic 3D images from a range of perspectives may be reproduced.

What is claimed is:

1. An autostereoscopic directional display apparatus comprising a plurality of displays and an optical combining system for combining outputs of the displays, wherein each of the displays comprises an autostereoscopic display device and co-operates with the optical combining system to provide a plurality of views which are visible in respective different directions.

2. An apparatus as claimed in claim 1, wherein each of the directions in which the views are visible comprises an angular range.

3. An apparatus as claimed in claim 2, wherein the angular ranges are angularly contiguous in a lateral plane.

4. An apparatus as claimed in claim 1, wherein the directions in which the views provided by each of the displays and the optical combining system are visible are different from the directions in which the views provided by the or other of the displays and the optical combining system are visible.

5. An apparatus as claimed in claim 4, wherein the directions in which the views provided by each of the displays are visible are interlaced with the directions in which the views provided by the or other of the displays are visible.

6. An apparatus as claimed in claim 1, wherein each of the displays comprises a temporally multiplexed display.

7. An apparatus as claimed in claim 6, wherein each of the displays comprises a spatial light modulator, an optical system, and a plurality of sequentially illuminatable light sources arranged to illuminate the spatial light modulator at respective different angles via the optical system.

8. An apparatus as claimed in claim 7 further comprising beam splitting means disposed between the light sources, which are common to the displays, and the spatial light modulators.

9. An apparatus as claimed in claim 8, wherein the beam splitting means comprises a beam splitter for splitting light from the light sources into a plurality of beams and a plurality of mirrors, each of which is arranged to reflect a respective beam towards a respective one of the spatial light modulators.

10. An apparatus as claimed in claim 9, wherein the beam splitter and the optical combining system are polarisation-sensitive so that substantially all of the light from the beam splitter is supplied by the optical combining system to a single observer region.

11. An apparatus as claimed in claim 11, wherein the light sources of each of the displays comprise a diffuse light source disposed behind a respective shutter.

12. An apparatus as claimed in claim 11, wherein the light paths from the shutters cross each other and intersect respective mirrors arranged to reflect light towards the respective spatial light modulators.

13. An apparatus as claimed in claim 11, wherein each of the shutters has an output polarisation which matches an input polarization of the respective spatial light modulator.

14. An apparatus as claimed in claim 1, wherein each of the displays comprises a spatially multiplexed display.

15. An apparatus as claimed in claim 14, wherein each of the displays comprises a spatial light modulator, a diffuse light source for illuminating the spatial light modulator, and an array of lenses or a parallax barrier disposed between the spatial light modulator and the optical combining system.

16. An apparatus as claimed in claim 15, wherein each of the arrays of lenses comprises a lenticular screen.

17. An apparatus as claimed in claim 1, wherein each of the displays comprises a temporally and spatially multiplexed display.

18. An apparatus as claimed in claim 1, wherein the optical combining system comprises at least one beam combiner having an optically transmissive path and an optically reflective path.

19. An autostereoscopic directional display apparatus according to claim 18 wherein the beam combiner represents the last element in the optical path of the autostereoscopic directional display apparatus prior to an observer location.

20. An apparatus as claimed in claim 1, wherein the optical combining system comprises at least one beam combiner, and the plurality of views are provided to an observer location substantially directly from the at least one beam combiner.

21. An apparatus as claimed in claim 20, wherein the at least one beam combiner receives the outputs of the displays substantially directly therefrom.

22. An apparatus as claimed in claim 1, wherein the optical combining system comprises at least one beam combiner and the at least one beam combiner receives the outputs of the displays substantially directly therefrom.

23. An autostereoscopic directional display apparatus comprising a plurality of displays and an optical combining system for combining outputs of the display, wherein each of the displays comprises a temporally and spatially multiplexed autostereoscopic display and co-operates with the optical combining system to provide a plurality of views which are visible in respective different directions, each of the autostereoscopic displays comprising a spatial light modulator, a first array of lenses or a first parallax barrier having a first pitch disposed adjacent a first side of the spatial light modulator, a second array of lenses or a second parallax barrier having a second pitch greater than the first pitch disposed adjacent a second side of the spatial light modulator between the spatial light modulator and the optical combining system, and a plurality of sequentially illuminatable light sources arranged to illuminate the first array of lenses or the first parallax barrier at respective different angles via the optical system.

24. An apparatus as claimed in claim 23 further comprising beam splitting means disposed between the light sources, which are common to the displays, and the spatial light modulators.

25. An apparatus as claimed in claim 24, wherein the beam splitting means comprises a beam splitter for splitting light from the light sources into a plurality of beams and a plurality of mirrors, each of which is arranged to reflect a respective beam towards a respective one of the spatial light modulators.

26. An apparatus as claimed in claim 25, wherein the beam splitter and the optical combining system are polarisation-sensitive so that substantially all of the light from the beam splitter is supplied by the optical combining system to a single observer region.

27. An apparatus as claimed in claim 23, wherein the light sources of each of the displays comprise a diffuse light source disposed behind a respective shutter.

28. An apparatus as claimed in claim 27, wherein the light paths from the shutters cross each other and intersect respective mirrors arranged to reflect light towards the respective spatial light modulators.

29. An apparatus as claimed in claim 27, wherein each of the shutters has an output polarisation which matches an input polarization of the respective spatial light modulator.

30. An autostereoscopic display apparatus comprising a plurality of two-dimensional displays and an optical combining system for combining the outputs of the displays, wherein each of the displays comprises a light source, a light-transmissive spatial light modulator arranged to modulate light from the light source in accordance with an image to be viewed, and a lens arrangement disposed adjacent the spatial light modulator and arranged to image the light source at a viewing window at an observer location via the optical combining system.

31. An apparatus as claimed in claim 30, wherein the light sources of the displays comprise a common light source, a beam splitter for dividing light from the common light source into a plurality of beams, and at least one reflector for reflecting a respective one of the beams towards the spatial light modulator of a respective one of the displays.

32. An apparatus as claimed in claim 31, wherein each of the displays has an optical axis and each of the lens arrangements has an optical axis which is laterally displaced from the optical axis of the respective display.

33. An apparatus as claimed in claim 30, wherein, for each of the displays, the light source comprises a diffuse light source, the lens arrangement comprises an array of lenses, and a parallax barrier is disposed between the light source and the array of lenses in an object plane of the array of lenses.

34. An apparatus as claimed in claim 33, wherein the array of lenses and the parallax barrier for each of the displays are interposed between the diffuse light source and the spatial light modulator.

35. An apparatus as claimed in claim 30, wherein each of the lens arrangements comprises an autocollimating screen.

36. An apparatus as claimed in claim 30, wherein each of the lens arrangement comprises an angular amplifying screen.

37. An apparatus as claimed in claim 30, wherein, for each of the displays, the light source comprises a single light source and the spatial light modulator is arranged to modulate light with an image representing a view from a single predetermined direction.

38. An apparatus as claimed in claim 30, wherein the optical combining system comprises at least one beam combiner, and the respective light sources are imaged at the viewing window substantially directly from the at least one beam combiner.

39. An apparatus as claimed in claim 38, wherein the at least one beam combiner receives the outputs of the displays substantially directly therefrom.

40. An apparatus as claimed in claim 30, wherein the optical combining system comprises at least one beam combiner and the at least one beam combiner receives the outputs of the displays substantially directly therefrom.

41. An apparatus as claimed in claim 30, wherein the lens arrangement for each of the displays is interposed between the light source and the spatial light modulator.

42. An apparatus as claimed in claim 30, wherein the lens arrangement for each of the displays comprises a Fresnel lens.

43. An apparatus as claimed in claim 30, wherein the light source for each of the displays is separate from the spatial light modulator.

44. An apparatus as claimed in claim 30, wherein the light source of each display is imaged at the viewing window which is a finite distance from the display.

45. An apparatus as claimed in claim 30, wherein the combined outputs of the displays are spatially multiplexed.

* * * * *